J. G. LYDECKER.
ROTARY PERCH.
APPLICATION FILED APR. 2, 1915.
1,192,441.
Patented July 25, 1916.
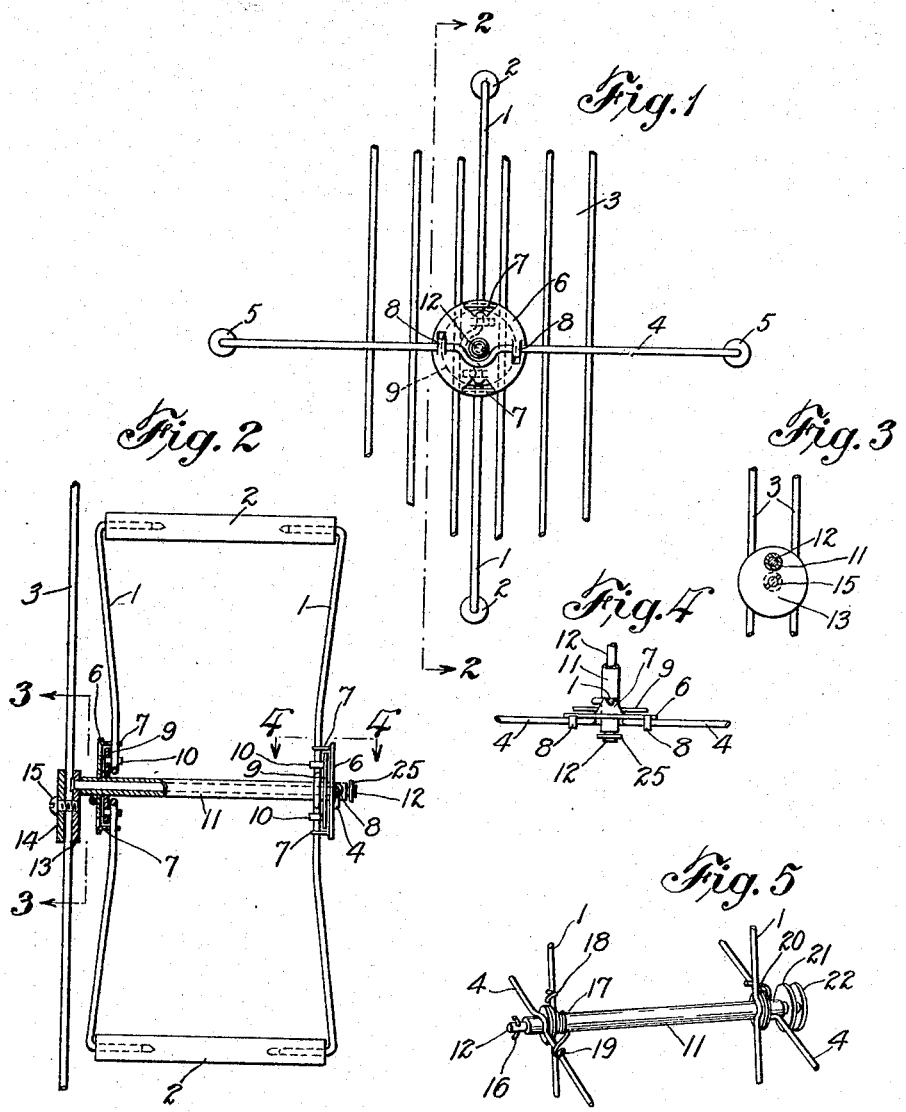

UNITED STATES PATENT OFFICE.

JOHN GEORGE LYDECKER, OF NEW YORK, N. Y.

ROTARY PERCH.

1,192,441.   Specification of Letters Patent.   Patented July 25, 1916.

Application filed April 2, 1915. Serial No. 18,642.

*To all whom it may concern:*

Be it known that I, JOHN GEORGE LYDECKER, a citizen of the United States, residing at New York, in the county of New York and State of New York, have invented certain new and useful Improvements in Rotary Perches, of which the following is a specification, reference being had therein to the accompanying drawing.

My invention relates to a perch device for use in bird cages and the like, one object being to provide a revolving wheel-like perch so mounted that the bird may hop about upon the same with agility and ease, and use it with as much profit and pleasure as if it were a resilient swaying twig of a tree.

Another object is to provide a rotary perch or support having very much the same character in its operation for the bird as does the Ferris wheel so extensively used in pleasure parks.

The invention, therefore, comprises a rotating device having a plurality of perch members and supported on the inside of the cage, the same being readily applied to the cage or removed therefrom and being foldable into a small compass so that it can be inserted or withdrawn through the usual door; and the invention also includes various details and peculiarities in the construction, arrangement and combination of parts, substantially as will be hereinafter described and then more particularly pointed out in the claims.

Figure 1 is a partial front elevation of my improved rotary perch; Fig. 2 is a sectional side elevation of the same applied to the wires of the cage on line 2, 2 of Fig. 1; Fig. 3 is a detail sectional view showing the manner of fastening the device to the cage on line 3, 3 of Fig. 2; Fig. 4 is a plan view on the line 4, 4 of Fig. 2; Fig. 5 is a partial perspective view of a modified form of the invention.

Similar characters of reference designate corresponding parts throughout the different figures of the drawing.

The invention is designed to be applied to any kind of a bird cage, and is usually fastened to the wires 3 of the side of the cage at any preferred point. One mode of mounting or attaching the device to the cage consists of a horizontal rod 12 secured to a disk 13 that is located on the inside of the wires 3, while directly opposite thereto on the outside of said wires is a similar disk 14 firmly fastened to the disk 13 by means of a central screw 15, so that in this way the wires are firmly clamped between the disks 13 and 14, which disks are preferably concentric in order to present a neat appearance.

A supporting rod 12 is fastened to the disk 13 at a point which in this specimen of the invention is obviously off the center. The rod 12 carries the central tube or sleeve 11 of the perch device which revolves on said rod. The end of the rod may be riveted, as shown in Fig. 2, a small washer 25 being interposed between the riveted end and the end of the sleeve 11, or instead of riveting the end, I may employ a pin, as 16, passing through a perforation in the end of the rod 12, as indicated in Fig. 5. When the pin 16 is used, the rod 12 can be allowed to remain permanently attached to the wall of the cage, without removing it when the perch is taken out for the purpose of cleaning, thus dispensing with the bother of adjusting and securing the disks 13 and 14, but when the end of the rod 12 is riveted, which will often be found desirable as tending to make the parts of the device less likely to become dislocated, it will be found necessary in removing the perch to first remove the set screw 15, thereby disconnecting the disks 13 and 14 and allowing the rod 12 and its attached disk 13 to be withdrawn from the cage with the device. It is, however, quite immaterial just how the perch is supported, and whether the supporting parts are left permanently in the cage or removed each time that the perch is taken out to be cleaned or repaired.

The perch comprises essentially two or more intersecting frames, each frame made of two parallel wires holding between their ends wooden rollers of a proper size and character to be easily gripped by the feet of the bird. One of these frames consists of the parallel wires 1, 1, the ends of which, as shown in Fig. 2, are bent to engage central openings in the ends of the rollers 2, 2. Another similar frame consists of the parallel wires 4, 4 as seen in Fig. 2, the ends of which similarly engage parallel rollers 5, 5. These frames intersect each other at the center and are provided with means for locking them rigidly in a position preferably ninety degrees apart, or otherwise as the case may be, in which position they will occupy their most open form for active use in making up the rotary device; or they may be folded closely together so that they will lie very nearly parallel or at least will be contracted within a small compass so as to be easily handled, inserted and removed through a small opening like the ordinary door in a cage. In Fig. 1 two of these frames are shown occupying their unfolded or extended position where they lie at right angles to each other.

I will now explain how the frames are secured together, and locked when unfolded, and unlocked and closed together when desired. Secured rigidly on the tube or sleeve 11, near each end thereof is a disk 6, preferably of circular form, and of brass or other metal or material, the same having at diametrically opposite points a pair of notched projections 7 stamped out of the metal of the disk, or otherwise fashioned or applied, and having also at other points on a diameter preferably at right angles to the diameter in which the notched projections 7 lie, a pair of lips 8. The lips 8 are bent around the wires 4 of one of the frames so as to rigidly attach said wire to the disk 6, (see Fig. 1) it being noted that each wire 4 is preferably curved partly around the sleeve 11 so that it may lie mainly in a position diametrically across the disk 6; and further it will be noted that the wires 1 of the other frame are similarly bent around the sleeve 11 so as to similarly lie diametrically across the face of the disk 6, and said wires 1 are adapted to engage the notched projections 7 when the frames are opened in the position at right angles to each other, and to be disengaged from these notched projections 7 at other times, the disengagement being readily made by pressing the wires 1 slightly toward each other, and further the said wires 1 are secured to disks 9 which are mounted loosely on the sleeve 11 at points closely contiguous to the disks 6 and preferably inside of the same so that they may revolve on the sleeve 11 when opening and closing the frames. These disks 9 are similar in form, shape and material to the disks 6, and are provided with lips 10 stamped out of the material thereof and closely bent around the wires 1, so as to firmly attach said wires to the disks 9 in a position which is diametrically across the face of the disks 9 as well as across the parallel disks 6. Thus if it be assumed that the frame composed of the wires 4 is relatively stationary after being placed in position in the cage, and the frame composed of the wires 1 be assumed to be the movable frame, it will be obvious that by moving the frame composed of wires 1 relatively to the other frame, it may be transferred from its idle or folded position into its active or extended position where the wires 1 are in engagement with the notches 7 of the disk 6, as in Fig. 1. When the frames are unfolded and locked the entire wheel is revolved upon the rod 12 by the action of the bird in hopping from roller to roller. Of course, it is apparent, as already suggested, that there may be more than two of these frames, in which case there would be more of the locking notches and more of the engaging clips and the parts would be properly arranged and related for this purpose with the proper spacing between them and the provision of additional disks or similar means for supporting the additional movable frames upon the central sleeve or hub 11, and I reserve the liberty of so varying and modifying and supplementing the parts as will be found necessary in constructing the rotary perch, with as many folding members as may be required to provide the desired number of perch rollers on the outer periphery of the revolving wheel when the parts are all placed in their normal active location for making up such rotary wheel or perch.

In Fig. 5 I have represented a modified form of the invention wherein the central supporting rod 12 is permanently attached to the side of the cage, it having disks 21 and 22 adapted to lock a number of the wires of the cage between them, and thus hold the rod 12 permanently attached, the perch being applied to said rod whenever desired by slipping sleeve 11 over rod 12 and then inserting the pin 16 through a perforation in the end of the rod. Two or more frames, one consisting essentially of the wires 1, and the other of the wires 4, are used as in the other case. I also employ a spring 17 coiled a few times around the sleeve 11, and having one end 18 attached to one of the wires 1, and the other end 19 attached to one of the wires 4, so that this spring 17, therefore, has the function of urging the frames toward each other, or away from each other, accordingly as the spring may be tensioned. There may be one or more of these springs, and the effect thereof will be to hold the frames in their extended position normally, allowing them to be closed together against the compression of the spring whenever it is desired to fold the frames to remove the perch from the cage. When the tension of the spring is such as to keep the frames normally extended, it will be necessary to provide a stop to hold them at right angles to each other, or at any other desired angle, an example of which stop is shown at 20, which consists simply of a pin fastened upon the sleeve 11, or otherwise attached in order to make a positive stop, against which the movable frame may contact when at its widest extension, but all these features may vary within considerable limits, and I may say that the general construction and arrangement of the parts in Fig. 5 are mainly the same as in the other figures with the addition of a spring device for holding the arms in their extended position, or in their closed position, as the case may be.

Various changes may be made in the construction, arrangement and relative location of all the parts for the purpose of carrying out the function of the invention in the best and most desirable manner, and I therefore reserve the liberty of changing and relating the mechanical elements in novel and different ways as experience may suggest.

Having thus described my invention, what I claim as new and desire to secure by Letters Patent, is:

1. In a perch for bird cages and the like, the combination of a central stationary support, a sleeve revolving thereon, frames carried by the sleeve and arranged to be relatively movable for closing and opening, said frames when open forming a wheel structure having perch devices in the periphery and a resilient connection between the frames.

2. In a rotary perch for bird cages, the combination of a stationary rod, a central member revoluble thereon, notched disks on the central member, a frame secured to said notched disks, another frame adjustable relatively to the first frame and adapted to be engaged by the notched disks, and rotary disks revolving on the central member and attached to the movable frame.

3. In a rotary perch for bird cages and the like, the combination with a stationary member, a central support revoluble thereon, disks secured thereon and provided with notched projections, a frame consisting of parallel wires fastened to said disks intermediate of the notched projections and carrying outer rollers, other disks arranged rotatably on the central support, and a frame consisting of parallel wires rigidly affixed to said latter disks and carrying also outer rollers, said latter wires being adapted to engage the notched projections in the first mentioned disks when the frames are extended.

In testimony whereof I affix my signature.

JOHN GEORGE LYDECKER.

Copies of this patent may be obtained for five cents each, by addressing the "Commissioner of Patents, Washington, D. C."